(12) United States Patent
Allen et al.

(10) Patent No.: US 10,329,933 B2
(45) Date of Patent: Jun. 25, 2019

(54) FLAPPER SEAL APPARATUS AND SYSTEM

(71) Applicant: United Technologies Corporation, Hartford, CT (US)

(72) Inventors: Richard N. Allen, West Hartford, CT (US); Brandon W. Spangler, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1135 days.

(21) Appl. No.: 14/660,585

(22) Filed: Mar. 17, 2015

(65) Prior Publication Data

US 2015/0354385 A1    Dec. 10, 2015

Related U.S. Application Data

(60) Provisional application No. 62/008,995, filed on Jun. 6, 2014.

(51) Int. Cl.
   *F01D 9/06*    (2006.01)
   *F01D 5/18*    (2006.01)

(52) U.S. Cl.
   CPC ............. *F01D 9/065* (2013.01); *F01D 5/189* (2013.01); *F05D 2240/55* (2013.01); *Y02T 50/672* (2013.01); *Y02T 50/676* (2013.01)

(58) Field of Classification Search
   CPC ....... F01D 9/065; F01D 5/189; F05D 2240/55
   See application file for complete search history.

(56) References Cited

U.S. PATENT DOCUMENTS

| | | | |
|---|---|---|---|
| 4,438,939 A | * | 3/1984 | Pask ................... F01D 11/025 277/644 |
| 2012/0315138 A1 | * | 12/2012 | Rao ........................ F01D 11/00 415/231 |
| 2015/0010384 A1 | * | 1/2015 | Hafner .................. F01D 5/3015 415/66 |

* cited by examiner

*Primary Examiner* — Richard A Edgar
*Assistant Examiner* — Michael L Sehn
(74) *Attorney, Agent, or Firm* — Snell & Wilmer, L.L.P.

(57) ABSTRACT

An engine component for isolating a first pressure and/or first flow and a second pressure and/or second flow is provided. The engine component may comprise a body portion, a first seal element and a second seal element. The body portion may include a first standoff and a second standoff. The first seal element housed within the body portion. The second seal element may also be housed within the body portion. The second seal element may be coupled to the first seal element.

20 Claims, 7 Drawing Sheets

FLAPPER SEAL APPARATUS AND SYSTEM

CROSS-REFERENCE TO RELATED APPLICATIONS

This application is a nonprovisional of, and claims priority to, and the benefit of U.S. Provisional Application No. 62/008,995, entitled "FLAPPER SEAL APPARATUS AND SYSTEM," filed on Jun. 6, 2014, which is hereby incorporated by reference in its entirety.

GOVERNMENT LICENSE RIGHTS

These inventions were made with government support under FA 8650-09-D-2923-0021 awarded by The United States Air Force. The government has certain rights in the inventions.

FIELD

The present disclosure relates to gas turbine engine sealing systems, and more particularly, to sealing systems responsive to pressure differentials.

BACKGROUND

The pressure differential between an engine inner flow channel and an engine outer flow channel can vary during engine operation. The pressure differential between the inner flow channel and the outer flow channel can cause the flow splits between the inner channel and outer channel to change, which may create inefficiencies and/or degrade performance of the engine (e.g., by creating a pressure loss, heat loss and/or the like).

SUMMARY

A seal for sealing a space defined by a standoff structure of an engine component is provided. The seal may comprise a first seal element and a second seal element. The first seal element may be offset from the second seal element. In this regard, the first seal element and the second seal element may define a gap. The gap may be configured to receive the standoff structure. The first seal element and the second seal element may be configured to respectively seal against opposite sides of the standoff structure.

A sealing system for a gas turbine engine is provided. The sealing system may comprise an engine component and a seal. The engine component may have a standoff structure defining a gap. The standoff structure may also have a first side and a second opposite side. The seal configured to selectively seal the gap on one of the first and second sides based on relative pressure on the first and second sides.

In various embodiments, a stator vane may comprise a body portion, a first seal portion and a second seal portion. The body portion may include a first standoff. The first seal element may be housed within the body portion. The second seal element may also be housed within the body portion. The second seal element may be coupled to the first seal element. The first seal element may be configured to load the first standoff in response to a first pressure condition. The second seal element may be configured to load the first standoff in response to a second pressure condition.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice these embodiments, it should be understood that other embodiments may be realized and that logical changes and adaptations in design and construction may be made in accordance with the present disclosure and the teachings herein. Thus, the detailed description herein is presented for purposes of illustration only and not for providing limitations on the scope of the disclosure. For example, the steps recited in any of the methods or process descriptions may be executed in any order and are not limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Moreover, surface shading lines may be used throughout the figures to denote different parts but not necessarily to denote the same or different materials.

Figure 1:
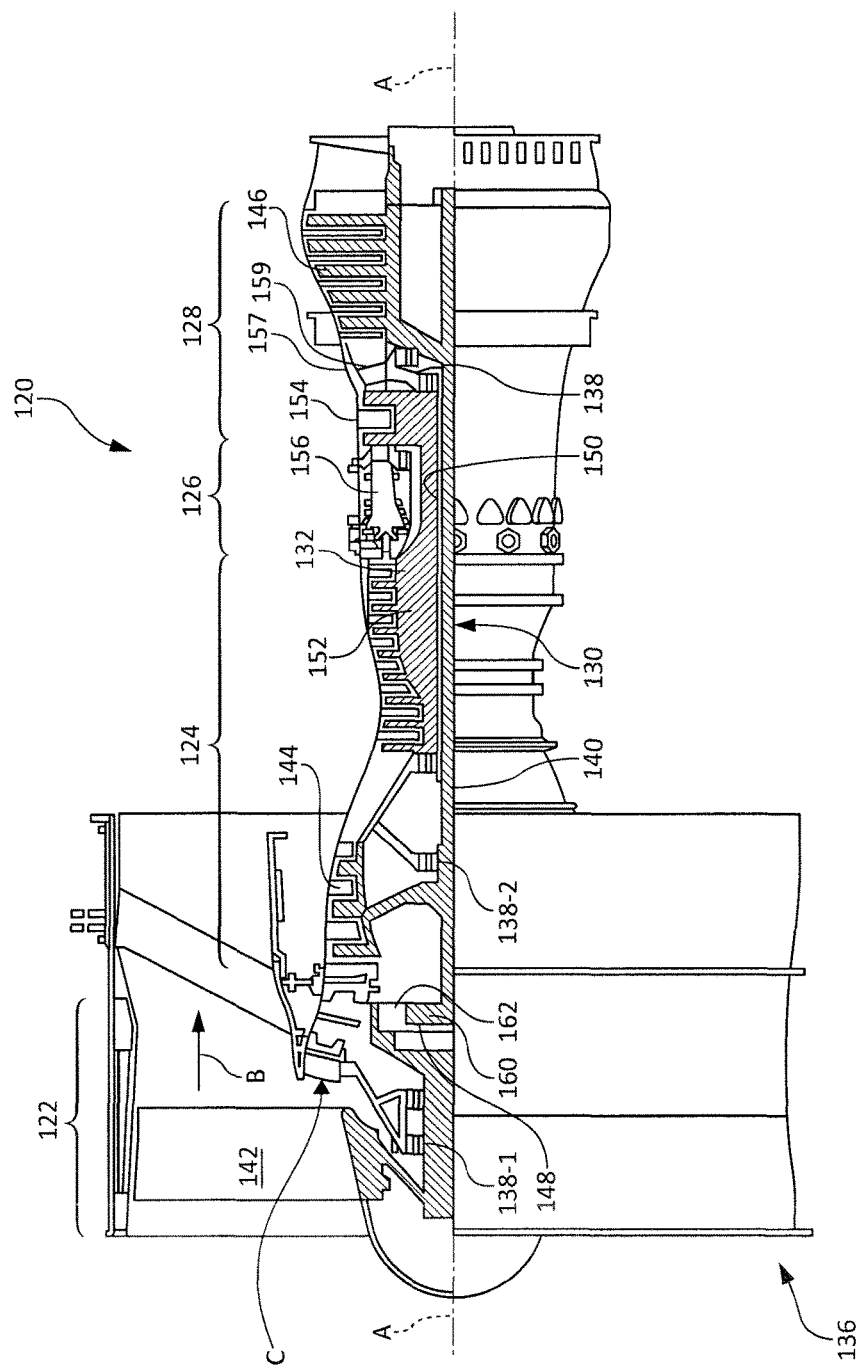
FIG. 1 illustrates cross-sectional view of an exemplary gas turbine engine, in accordance with various embodiments.

In various embodiments and with reference to FIG. 1, a gas turbine engine 120 is provided. Gas turbine engine 120 may be a two-spool turbofan that generally incorporates a fan section 122, a compressor section 124, a combustor section 126 and a turbine section 128. Alternative engines may include, for example, an augmentor section among other systems or features. In operation, fan section 122 can drive air along a bypass flow-path B while compressor section 124 can drive air along a core flow-path C for compression and communication into combustor section 126 then expansion through turbine section 128. Although depicted as a turbofan gas turbine engine 120 herein, it should be understood that the concepts described herein are not limited to use with turbofans as the teachings may be applied to other types of turbine engines including three-spool architectures.

Gas turbine engine 120 may generally comprise a low speed spool 130 and a high speed spool 132 mounted for rotation about an engine central longitudinal axis A-A' relative to an engine static structure 136 via one or more bearing systems 138 (shown as bearing system 138-1 and bearing system 138-2 in FIG. 1). It should be understood that various bearing systems 138 at various locations may alternatively or additionally be provided including, for example, bearing system 138, bearing system 138-1, and bearing system 138-2.

Low speed spool 130 may generally comprise an inner shaft 140 that interconnects a fan 142, a low pressure (or first) compressor section 144 and a low pressure (or first) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 couples inner shaft 140 to a rotating fan structure. High speed spool 132 may comprise an outer shaft 150 that interconnects a high pressure compressor ("HPC") 152 (e.g., a second compressor section) and high pressure (or second) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and rotate via bearing systems 138 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 144 then HPC 152, mixed and burned with fuel in combustor 156, then expanded over high pressure turbine 154 and low pressure turbine 146. Mid-turbine frame 157 includes airfoils 159 which are in the core airflow path. Low pressure turbine 146 and high pressure turbine 154 rotationally drive the respective low speed spool 130 and high speed spool 132 in response to the expansion.

Gas turbine engine 120 may be, for example, a high-bypass geared aircraft engine. In various embodiments, the bypass ratio of gas turbine engine 120 may be greater than about six (6). In various embodiments, the bypass ratio of gas turbine engine 120 may be greater than ten (10). In various embodiments, geared architecture 148 may be an epicyclic gear train, such as a star gear system (sun gear in meshing engagement with a plurality of star gears supported by a carrier and in meshing engagement with a ring gear) or other gear system. Geared architecture 148 may have a gear reduction ratio of greater than about 2.3 and low pressure turbine 146 may have a pressure ratio that is greater than about 5. In various embodiments, the bypass ratio of gas turbine engine 120 is greater than about ten (10:1). In various embodiments, the diameter of fan 142 may be significantly larger than that of the low pressure compressor 144, and the low pressure turbine 146 may have a pressure ratio that is greater than about 5:1. Low pressure turbine 146 pressure ratio may be measured prior to inlet of low pressure turbine 146 as related to the pressure at the outlet of low pressure turbine 146 prior to an exhaust nozzle. It should be understood, however, that the above parameters are exemplary of various embodiments of a suitable geared architecture engine and that the present disclosure contemplates other gas turbine engines including direct drive turbofans.

Figure 2:
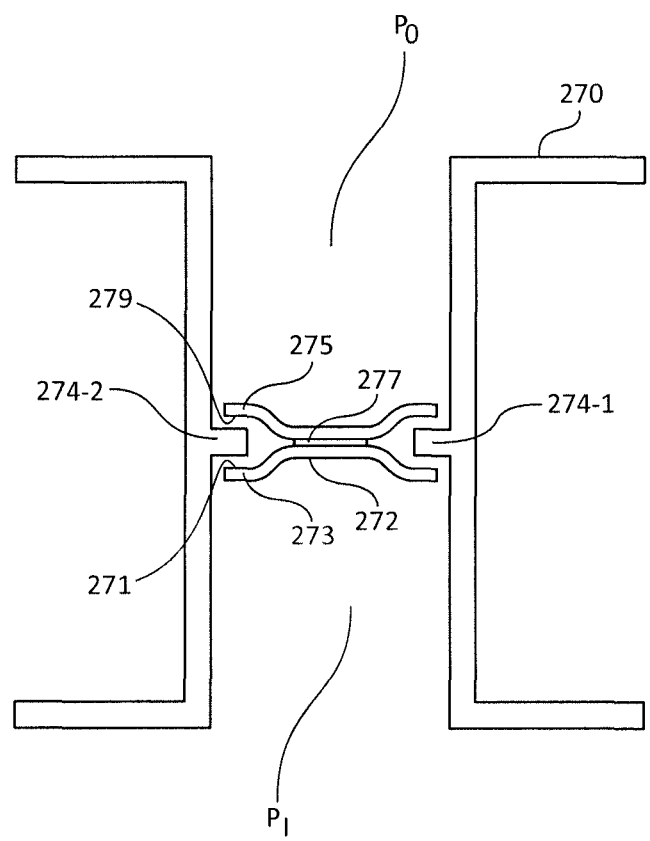
FIG. 2 schematically illustrates a cross-sectional view of an engine component comprising a first flapper seal, in accordance with various embodiments.
Figure 4B:
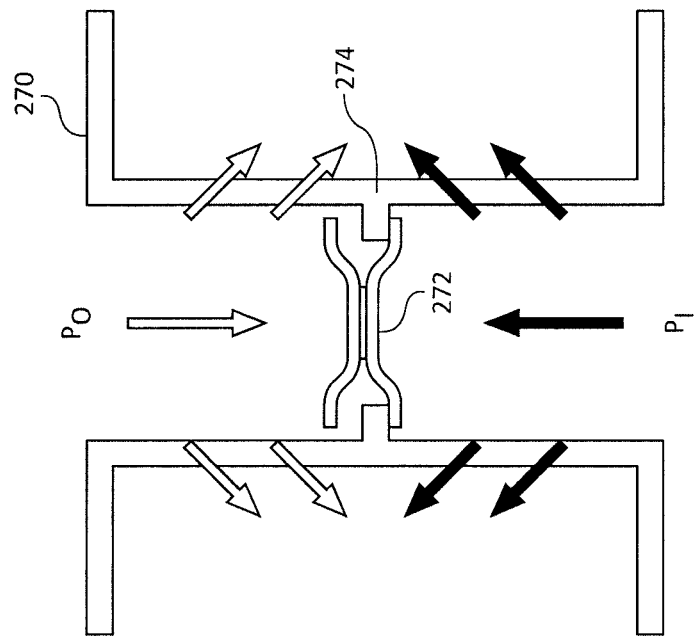
FIG. 4B schematically illustrates a cross-sectional view of an engine component comprising a first flapper seal in a second loaded condition, in accordance with various embodiments.

In various embodiments and with reference to FIGS. 2 and 4B, an engine component 270 may contain a boundary between a first channel with a pressure $P_I$ and a second channel with a pressure $P_O$. A boundary and/or separation may be created by and/or defined by a flapper seal 272. Flapper seal 272 may be configured to rest against and/or load against a load bearing surface and/or sealing surface of engine component 270 such as, for example, first standoff portion 274-1 and/or second standoff portion 274-2. In this regard, flapper seal 272 may be configured to substantially maintain different pressures on the opposite sides of flapper seal 272. First standoff portion 274-1 and second standoff portion 274-2 may be portions of a single standoff in engine component 270. First standoff portion 274-1 and second standoff portion 274-2 may also be separate structures of two or more engine components and/or a single clam shell component. In this regard, one or more portions of flapper seal 272 may be loaded against and/or may seal against a standoff (e.g., first standoff portion 274-1 and second standoff portion 274-2).

In various embodiments, flapper seal 272 may be configured to maintain a pressure differential between the first channel and the second channel of one or more engine components and/or structures. By maintaining the differential pressure between the first channel and the second channel, the flow split between the first and second channel may be maintained. In this regard the flow split may be maintain and/or may remain relatively unchanged in response to a change in the pressure differential across flapper seal 272. Moreover, where the flow split between the first and second channels are maintained, the Mach numbers, pressure losses, and heat transfer may remain relatively constant regardless of changes in pressure differential. Maintaining the flow split between the first and second channel may also reduce overall stress and/or thermal loads in various engine components in response to a change in differential pressure between the first channel and the second channel.

In various embodiments, flapper seal 272 may be an annular structure configured to seal against a supporting annular structure (e.g., a standoff). Flapper seal 272 may comprise a first seal element 273 and a second seal element 275. First seal element 273 may be shaped to have a concave outer portion and a flat middle portion. Second seal element 275 may also be shaped to have a concave outer portion and a flat middle portion. First seal element 273 may be operatively coupled to and/or fixedly attached to second seal element 275 via an attachment 277 (e.g., a coupling member). First seal element 273 and second seal element 275 are in an opposing orientation. In this regard, the opposing concave portions (e.g., the outer portions) of first seal element 273 and second seal element 275 may define a gap that is configured to receive a standoff (e.g., standoff 274). Moreover, flapper seal 272 may be configured to translate longitudinally in response to changes in the pressure differential between pressure $P_I$ and pressure $P_O$. Moreover, flapper seal 272 may float and/or translate freely about standoff 274. In this regard, flapper seal 272 may not be coupled and/or connected to standoff 274.

In various embodiments, first seal element 273 may comprise a sealing surface 271. Sealing surface 271 may be a substantially flat surface. Moreover, sealing surface 271 may be substantially smooth. Second seal element 275 may comprise a sealing surface 279. Sealing surface 279 may be a substantially flat surface. Moreover, sealing surface 279 may be substantially smooth.

In various embodiments and for example, flapper seal 272 may be installed about a standoff 274, such as, for example, standoff rail in an internal cooling cavity of engine component 270. Flapper seal 272 may seal and/or push against standoff 274 based on the pressure differential between the first pressure $P_I$ and the second pressure $P_O$. In this regard, where the first pressure $P_I$ is greater than the second pressure $P_O$, first sealing surface 271 may push and/or seal against standoff 274. Similarly, where the first pressure $P_1$ is less than the second pressure $P_O$, second sealing surface 279 may push and/or seal against standoff 274.

In various embodiments, attachment 277 may be any suitable attachment including, for example, a weld, brazing, a chemical attachment, an adhesive attachment, a mechanical attachment, an electromechanical attachment, and/or the like. In this regard, first seal element 273 and second seal element 275 may be operatively coupled together to form flapper seal 272. Moreover, flapper seal 272 may be configured to seal against first standoff portion 274-1 and/or second standoff portion 274-2 to isolate the pressure $P_I$ of the first flow channel from the pressure $P_O$ of the second flow channel.

In various embodiments, first seal element 273 and/or second seal element 275 may be formed from any suitable material capable of sustaining high thermal loads. In this regard, first seal element 273 and/or second seal element 275 may be a high temperature metal (e.g., an austenitic nickel-chromium-based alloy such as INCONEL), a high temperature composite, and/or the like. Moreover, the pressure load on first seal element 273 and/or second seal element 275 may be relative low. For example, the differential pressure between pressure $P_O$ and pressure $P_I$ may be approximately 35 psi or less.

Figure 3:
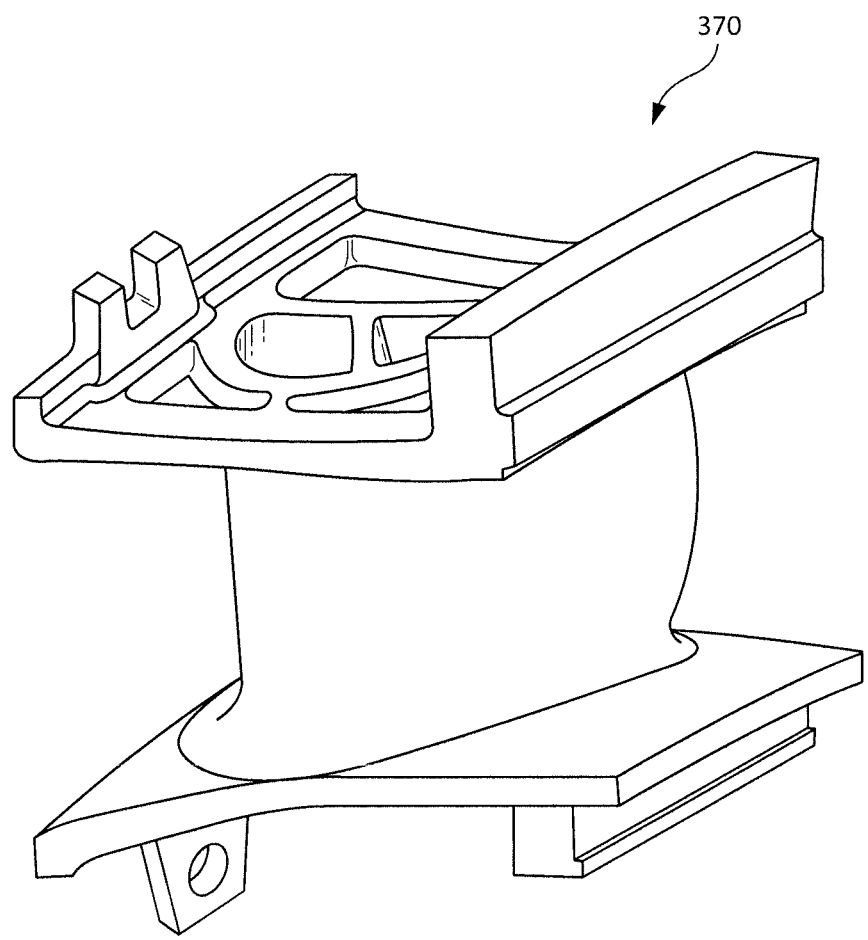
FIG. 3 illustrates a perspective view of a stator vane, in accordance with various embodiments.

In various embodiments and with reference to FIG. 3, engine component 370, may be any suitable component 370 including, for example, a stator vane. Component 370 may be a portion of a stator in turbine section 128 (e.g., a stator vane in high pressure turbine 154 and/or low pressure turbine 148) of gas turbine engine 120, as shown in FIG. 1. Moreover, component 370 may be any suitable gas turbine engine component including, for example, a blade outer air seal, a stator vane in a compressor, and/or any suitable aircraft component that is configured to isolate two or more channels, if the channels are at different pressures. In this regard, the flapper seal may be used in and/or between the various engine components in any portion of the engine. In operation, component 370 may have a hollow core and/or define a channel. A first end of the channel may be in fluid communication with an outer channel of the engine. A second end of the channel may be in fluid communication with an inner channel of the engine. The flapper seal may be installed in the channel in engine component 370 to prevent mixing of the flows in the outer channel of the engine and the inner channel of the engine during transient engine operations.

For example, during take-off, climb, high altitude cruise, and/or descent, transient aircraft engine conditions may cause the pressure differential between an inner channel of the engine and an outer channel of the engine to change creating the potential to mix the flows. This mixing may cause engine inefficiencies. In this regard, flapper seal 272 may be configured to isolate the differential pressure between the inner diameter pressure $P_I$ and the outer diameter pressure $P_O$. Moreover, the pressure differential between $P_I$ and $P_O$ may be approximately 35 psi or less. In various embodiments, the pressure differential between $P_O$ and $P_I$ may be 25 psi, 20 psi, and/or the like.

Figure 4A:
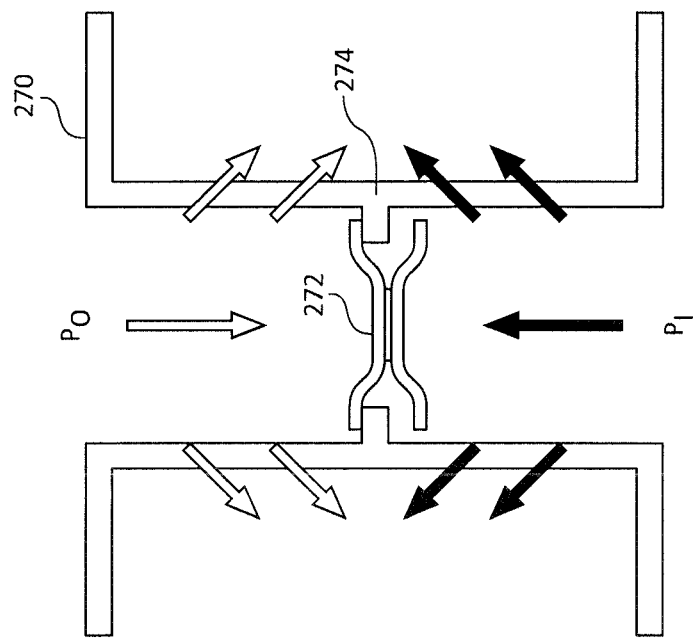
FIG. 4A schematically illustrates a cross-sectional view of an engine component comprising a first flapper seal in a first loaded condition, in accordance with various embodiments.

In various embodiments and in operation and with reference to FIGS. 4A and 4B, flapper seal 272 may be configured to load on standoff 274. Flapper seal 272 may not be coupled to any of the structure of engine component 270. In this regard, flapper seal 272 may be a separate component contained within engine component 270 based on the engagement of standoff 274 by flapper seal 272. Moreover, flapper seal 272 may be configured to isolate the second pressure $P_O$ from the first pressure $P_I$. The pressure differential present at engine component 270 may be divided and/or isolated by flapper seal 272. For example and as shown in FIG. 4A, flapper seal 272 may be in a first loaded condition where $P_O$ is greater than $P_I$. Moreover, flapper seal 272 may be in a second loaded condition where $P_I$ is greater than $P_O$, as shown in FIG. 4B.

Figure 5B:
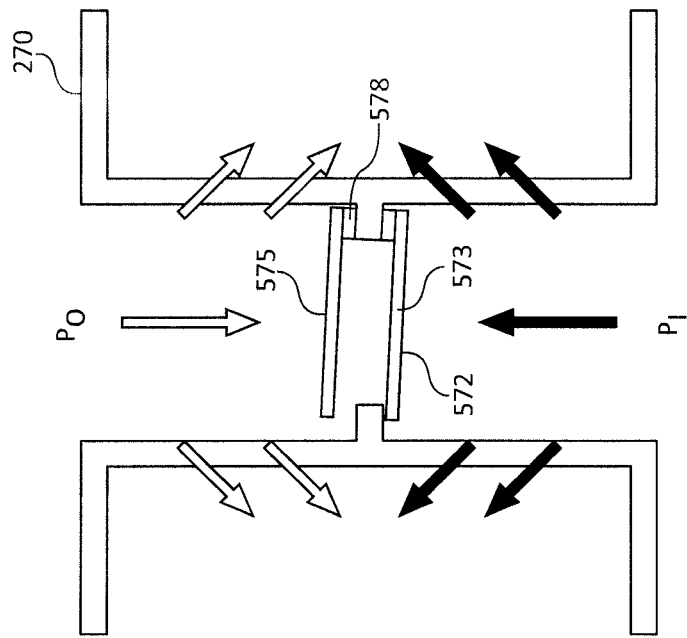
FIG. 5B schematically illustrates a cross-sectional view of an engine component comprising a second flapper seal in a second loaded condition, in accordance with various embodiments.
Figure 5A:
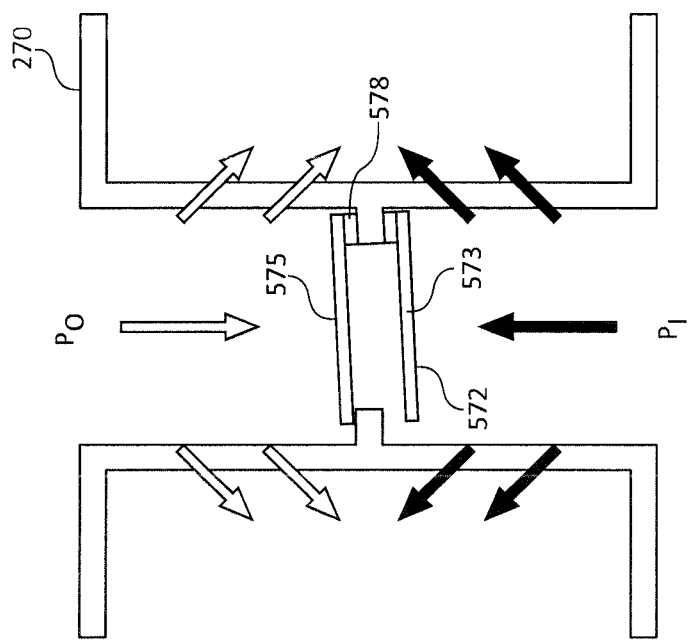
FIG. 5A schematically illustrates a cross-sectional view of an engine component comprising a second flapper seal in a first loaded condition, in accordance with various embodiments.

In various embodiments and with reference to FIGS. 5A and 5B, engine component 270 may comprise a flapper seal 572. Flapper seal 572 may comprise a first seal element 573 and a second seal element 575. Flapper seal 572 may further comprise a flapper hinge 578. First seal element 573 and second seal element 575 may be operatively coupled to flapper hinge 578. Flapper hinge 578 may be configured to allow first seal element 573 and second seal element 575 to move and/or actuate between first standoff portion 274-1 and second standoff portion 274-2 in response to the pressure differential between pressure $P_I$ and pressure $P_O$. In this regard and in response to the second pressure $P_O$ being greater than the first pressure $P_I$, a second seal element 575 may operatively load second standoff portion 274-2 where flapper hinge 578 is operatively coupled to and/or actuated about first standoff portion 274-1. In various embodiments where the pressure differential between the internal pressure $P_I$ and the second pressure $P_O$ is greater, flapper seal 272 may be configured to load second standoff portion 274-2 causing flapper hinge 578 to allow flapper seal portion 573 to actuate such that the first pressure $P_I$ is isolated from the second pressure $P_O$.

Figure 6:
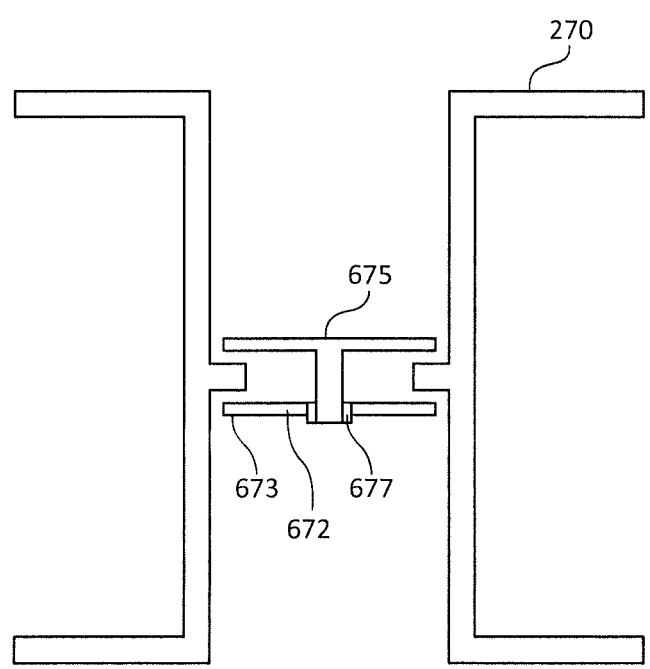
FIG. 6 schematically illustrates a cross-sectional view of an engine component comprising a third flapper seal, in accordance with various embodiments.

In various embodiments and with reference to FIG. 6, engine component 270 may comprise a flapper seal 672. Flapper seal 672 may comprise a first seal element 673 and a second seal element 675. First seal element 673 and second seal element 675 may be operatively coupled by a coupling mechanism 677 (e.g., a coupling member). Coupling mechanism 677 may operatively couple to and/or hold first seal element 673 and second seal element 675. In this regard, flapper seal 672 may be configured to translate and/or load first standoff portion 274-1 and second standoff portion 274-2 in response to the pressure differential between pressure $P_I$ and pressure $P_O$ being different.

Figure 7:
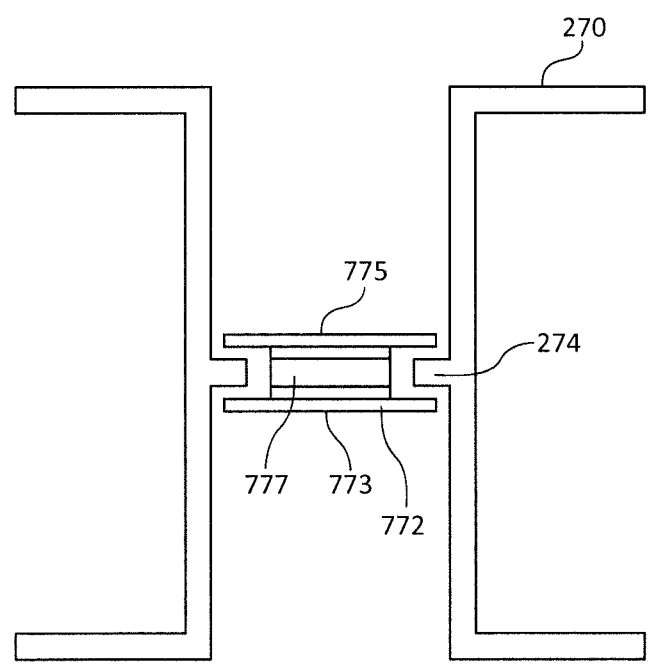
FIG. 7 schematically illustrates a cross-sectional view of an engine component comprising a fourth flapper seal, in accordance with various embodiments.

In various embodiments and with reference to FIG. 7, engine component 270 may comprise a flapper seal 772 comprising a first seal element 773 and a second seal element 775. First seal element 773 and second seal element 775 may be operatively coupled to a common core 777. In this regard, first seal element 773 and second seal element 775 may be operatively coupled to and/or configured to attach to common core 777 by any suitable mechanical, chemical mechanical, and/or electromechanical attachment mechanism (e.g., a coupling member). In this regard, first seal element 773 and second seal element 775 may be operatively coupled to and/or attached to common core 777 by a weld, braze, adhesive, electromechanical, chemical mechanical, and/or any other suitable attachment method.

Benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, such benefits, advantages, and any elements that may cause any benefit or advantage to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal for sealing a space defined by a standoff portion of at least one engine component, the seal comprising:
   a first seal element; and
   a second seal element offset to the first seal element, the first seal element and the second seal element defining a gap between a first surface of the first seal element and a second surface of the second seal element, wherein the second surface is oriented toward the first surface, and wherein the gap is configured to receive the standoff portion with the standoff portion located between the first surface of the first seal element and the second surface of the second seal element,
   wherein the first seal element and the second seal element are configured to respectively seal against opposite sides of the standoff portion such that when the first surface of the first seal element contacts a first side of the standoff portion, the second surface of the second seal element is spaced apart from a second side of the standoff portion opposite the first side of the standoff portion.

2. The seal of claim 1, further comprising a coupling member, wherein the first seal element and the second seal element are coupled together by the coupling member.

3. The seal of claim 2, wherein the coupling member is at least one of a weld, brazing, a chemical bond, an adhesive bond or a mechanical bond.

4. The seal of claim 1, wherein the first seal element comprises a flat annular portion that is configured to seal against the standoff portion.

5. The seal of claim 1, wherein the first seal element is configured to load the first side of the standoff portion in response to a first pressure differential within the at least one engine component.

6. The seal of claim 1, further comprising a hinge element coupling the first and second seal elements.

7. The seal of claim 6, wherein the standoff portion comprises a first standoff portion and a second standoff portion, and wherein the hinge element couples the first seal element and the second seal element to the first standoff portion.

8. The seal of claim 7, wherein the first seal element is configured to load the second standoff portion in response to a first pressure condition.

9. The seal of claim 7, wherein the second seal element is configured to load the second standoff portion in response to a second pressure condition.

10. The seal of claim 1, wherein the first seal element and the second seal element are coupled to a common core.

11. The seal of claim 1, wherein at least one of the first seal element or the second seal element are configured to substantially maintain different pressures on opposite sides thereof.

12. A sealing system for a gas turbine engine, the sealing system comprising:
   an engine component having a standoff portion, the standoff portion having a first side and a second side opposite the first side; and
   a seal configured to selectively load on one of the first side or the second side based on relative pressure on the first side and the second side, the seal comprising:
      a first seal element; and
      a second seal element offset to the first seal element, wherein the standoff portion is located between a first surface of the first seal element and a second surface of the second seal element, wherein the second surface is oriented toward the first surface, and wherein the first seal element and the second seal element are configured to respectively seal against the first side and the second side of the standoff portion such that when the first surface of the first seal element contacts the first side of the standoff portion, the second surface of the second seal element is spaced apart from the second side of the standoff portion.

13. The sealing system of claim 12, wherein the first seal element is coupled to the second seal element via an attachment.

14. The sealing system of claim 13, wherein the attachment is at least one of a chemical bond, a mechanical bond, and a hinge.

15. The sealing system of claim 12, wherein the engine component includes a stator vane.

16. A stator vane, comprising:
a body portion including a first standoff portion;
a first seal element housed within the body portion; and
a second seal element housed within the body portion, the second seal element coupled to the first seal element, wherein the first standoff portion is located between a first surface of the first seal element and a second surface of the second seal element oriented toward the first surface of the first seal element, and wherein the first seal element is configured to load a first side of the first standoff portion in response to a first pressure condition and the second seal element is configured to load a second side of the first standoff portion opposite the first side in response to a second pressure condition such that when the first surface of the first seal element contacts the first side of the first standoff portion, the second surface of the second seal element is spaced apart from the second side of the first standoff portion.

17. The stator vane of claim 16, wherein the first seal element and the second seal element are coupled together by a hinge.

18. The stator vane of claim 17, wherein the hinge is coupled to the body portion.

19. The stator vane of claim 16, wherein the body portion further comprises a second standoff portion.

20. The stator vane of claim 19, wherein the first seal element and the second seal element are configured to load the first standoff portion and the second standoff portion.

* * * * *